United States Patent Office 2,849,385

Patented Aug. 26, 1958

1

2,849,385

PROCESS FOR PREPARING LUBRICATING OILS

James H. Kirk, Dyer, Ind., assignor to Sinclair Refining Company, New York, N. Y., a corporation of Maine No Drawing. Application May 2, 1955
Serial No. 505,549

4 Claims. (Cl. 196—147)

This invention relates to aircraft lubrication and, in particular, relates to an improved method for producing non-additive lubricating oil compositions especially useful for lubrication of aircraft engines.

The production of lubricating oil compositions is in many respects an empirical art notwithstanding extensive study of the field. Often each lubrication problem requires a composition conforming to special specifications; and differing compositions frequently require different processing steps to produce. Thus, what may be applicable to a given oil fraction from one source is frequently without significance in preparing a lubricating oil composition conforming to the same specifications from a fraction originating from entirely different basic stock.

Of the problems of lubricating oil performance, one peculiar to the aircraft field is that failure to lubricate properly in service cannot be tolerated since a plurality of chances may not exist. Hence, special tests have been established by some engine manufacturers as a control on permissible limits of certain properties of the compositions employed in an effort to insure the necessary performance. One such test is known as the MacCoull-Ryder oxidation corrosion test (see SAE Journal, August 1942) and specifications of at least one engine manufacturer indicate that engine lubricating oil compositions showing corrosion of greater than 500 milligrams (lead loss of lead coated steel bearing) by this test should be carefully watched. Frequently, in manufacturing a saleable product the lead loss must be less than 50 milligrams. Of course, compositions requiring special precautions or which need to be tested frequenlty increase maintenance costs and this fact can militate against their use.

I have now discovered an improved method whereby aircraft engine non-additive lubricating oil compositions can be produced which are characterized by a low corrosion indication by the MacCoull-Ryder test. The improved method involves sequential treatment of each component of the lubricating oil composition with defined quantities of particular clays within prescribed temperature conditions. The lubricating oil compositions produced in accordance with the invention contain about 5 to 50 volume percent refined neutral oil and about 50 to 95 volume percent of a refined heavy mineral lubricating oil fraction of about 80 to 200 SUS at 210° F., e. g. bright stocks. The components to be blended are obtained by contacting with an acid activated clay, for example acid activated montmorillonite, followed by contacting with a neutral clay such as fuller's earth. Thus the sequential treatment involves dual clay contact. Each component can be contacted separately and the resulting materials blended, or the acid activated clay contacting can be accomplished on each component separately, the resulting components blended and then the resulting blend subjected to the neutral clay contact.

Thus the essence of the present invention comprises treatment of the components to be used in the lubricating oil composition with particular clays in a defined manner. More specifically, the heavy lube oil stock is contacted with acid treated clay, i. e. acid activated montmorillonite, in a quantity of about 4 to 8 pounds per barrel, and preferably 6 or 7 pounds per barrel at a temperature of about 500 to 600° F., especially 550° F. The neutral oil component is contacted with about 1 to 5 pounds of acid activated clay per barrel at a temperature of about 325 to 450° F. Particularly advantageous results are achieved when employing 2 to 4 pounds of the acid activated clay, and especially 3 pounds, at a temperature of at least 400° F. The neutral clay contacting step is substantially identical for each component although, as indicated before, it can be conducted on each component separately or on the acid activated clay treated components jointly. Advantageously, 2 to 15 pounds and preferably three pounds of neutral clay are employed per barrel of oil treated at a temperature of about 275 to 350° F., and preferably 325° F. At the end of each contacting step light, unstable ends having boiling points of up to 700° F., which are principally cracked unsaturates, are removed, advantageously by steam stripping preferably at the temperature of clay contact so that temperature adjustment need not be made. Removal of these light ends is essential after the acid activated clay treatment and is highly desirable after the neutral clay treatment also. Such stripping preferably is accomplished in the presence of the clay, though stripping also can be effected after separating the clay from the oil component. The materials removed are detrimental since they are subject to oxidation and since they act as oxidation promoters.

The clays which can be employed for the contacting steps producing compositions of the present invention are known articles of commerce. For example a typical acid activated clay is acid activated montmorillonite and is commercially available as the various Filtrols. Suitable neutral clays include bauxite and fuller's earth and a particularly desirable commercially available neutral clay is known as attapulgus clay.

As has been pointed out above, each clay contacting step is conducted in the presence of a defined amount of a particular clay within certain temperature limitations. It has been discovered that treatment of the neutral oil with quantities of the defined clay which do not conform to the prescribed limits can be detrimental to the resulting composition. For example, in the instance that an insufficient amount of clay is employed, the treatment fails to reduce corrosiveness sufficiently; the use of an excess quantity of clay tends to increase corrosiveness over that previously obtained or over that originally evidenced. It has also been discovered that the use of low temperatures outside the defined range can have a similar effect. In other words both temperature and quantity of clay must be correlated in my invention to result in the critical sequential operation which is essential to secure a satisfactory product.

The contacting steps employed in the invention are effected in any manner known to the art. Particularly satisfactory results are obtained by slurrying the clay with the oil fraction at the proper temperature, agitating to insure that all of the oil present is treated and then removing the solids from the slurry to secure the treated product. The solids can be removed by settling, filtration or other means. If desired, filter presses or other apparatus designed to speed the operation can be employed.

Neutral oil and bright stocks are well-known commercially available mineral oil fractions obtainable from various crudes. Generally refined neutral oils are obtained as a solvent, e. g. phenol, extracted, dewaxed distillate from a vacuum still distillation of a reduced crude. For purposes of the present invention, the neutral oil must have a viscosity of about 300 to 600 SUS at 100° F. To secure a neutral oil with this viscosity, the neutral oil is steam stripped of sufficient light ends until the desired viscosity is obtained. Bright stock normally is obtained as the deasphalted, solvent extracted, dewaxed 80 to 200 SUS at 210° F. heavy residuum from a distillation of reduced crude. In certain crude oil refining operations, bright and cylinder stocks are distillates.

The invention will be described further in conjunction with the following specific examples. It should be understood that the details disclosed are not to be considered as limiting the invention.

EXAMPLE I

A straight run neutral oil obtained from a vacuum still distillation of a Mid-Continent reduced crude oil was phenol extracted and dewaxed by the methylethylketone process according to conventional procedures. The resulting neutral oil had a viscosity of 440 SUS at 100° F. and a viscosity index of 95.5. The neutral oil was heated to 400° F. and about 3 pounds of Filtrol No. 70 per barrel of oil then was slurried with the oil. The slurry was agitated and steam at 400° F. was passed through to strip out light ends. The resulting mass was filtered and the treated neutral oil recovered.

A straight run bright stock fraction obtained upon propane deasphalting, phenol extracting and methylethylketone dewaxing a heavy lubricating oil residuum resulting upon vacuum distilling a Mid-Continent heavy reduced crude was employed in this example. The bright stock had a viscosity of 162 SUS at 210° F. and a viscosity index of 95.3. The bright stock was heated to 600° F. and Filtrol No. 70 was added in an amount equivalent to 6 pounds per barrel. After a period of agitation, steam at 600° F. was passed through the mass to remove light ends; the slurry was filtered and the treated bright stock recovered.

The thus treated neutral oil and bright stock were then blended by mixing at ambient temperature to result in a blend containing 39 volume percent neutral oil and 61 volume percent bright stock. The blend was heated to 320° F. and attapulgus clay was slurried into the blend in an amount equivalent to 3 pounds per barrel of blend. After a period of agitation the mixture was steam stripped with steam at 320° F. and the slurry was then filtered to remove the clay; the treated blend was recovered as product.

Tests were conducted on the Filtrol treated neutral oil, the untreated bright stock, the Filtrol treated bright stock, the blend of Filtrol treated neutral oil and bright stock and the dual treated finished oil compositions. The data obtained are:

Table I

| MacCoull-Ryder test (5 hrs. at 320° F., copper catalyst) | Filtrol contacted neutral oil | Uncontacted bright stock | Filtrol contacted bright stock | Blend of filtrol contacted fractions | Dual contacted blend |
|---|---|---|---|---|---|
| Lead bearing loss, mgs | 1 1,203 | 1 204 | 1 21.4 | 276 | 1 15.8 |
| Viscosity increase (SUS/210° F.) | 1 79.9 | 1 37 | 1 10.9 | 35.2 | 1 5.0 |
| Acid number | 1 19.9 | 1 4.85 | 1 1.20 | 7.3 | 1 1.40 |

[1] Average of a plurality of tests.

From these data it can be observed that a lubricating oil composition was produced from a highly corrosive neutral oil and a moderately corrosive bright stock and the resulting composition showed superior qualifications for aircraft engine lubrication as evidenced by the MacCoull-Ryder test.

EXAMPLE II

To show the effect of the use of excessive amounts of acid activated and neutral clays on the neutral oil, a straight run neutral oil having a viscosity of 525 SUS at 100° F. and obtained by phenol extracting and methylethylketone dewaxing a neutral oil fraction from a vacuum still distillation of a Mid-Continent crude oil was divided into several samples. The first sample was not contacted; a second sample was contacted with 24 pounds of Filtrol No. 70 per barrel; a third sample was contacted with 30 pounds of attapulgus clay per barrel; a fourth sample was contacted with 3 pounds of Filtrol No. 70 and 30 pounds of attapulgus clay per barrel; and a fifth sample was contacted with 3 pounds of the Filtrol and 9 pounds of attapulgus clay per barrel. Significant data obtained in these tests are as follows:

Table II

|  | No contact | Filtrol contact | Attapulgus contact | Dual—with excessive attapulgus | Dual contact |
|---|---|---|---|---|---|
| Filtrol dosage, lb./bbl |  | 24 |  | 3 | 3. |
| Attapulgus dosage, lb./bbl |  |  | 30 | 30 | 9. |
| Contact temp., °F |  | 350 | 300 | Filtrol—350, Atta.—300 | Filtrol—350, Atta.—300. |
| MacCoull-Ryder test: |  |  |  |  |  |
| Lead bearing loss, mgs | 1,218 | 1 1,350 | 1 1,117 | 1,159, 1,045 2 | 239. |
| Viscosity increase (SUS/210° F.) | 62.5 | 1 68.3 | 1 65.5 | 89.0, 80.4 | 45.4. |
| Acid number | 19.9 | 1 20.9 | 1 21.6 | 20.5, 20.0 | 20.0. |

[1] Average of a plurality of tests.
[2] At the end of the Filtrol contact, this oil evidenced a 955 mg. loss.

These data demonstrate that in the individual steps, the use of the clay contacting materials even in high concentrations will not correct the high corrosion characteristics. Similarly, in dual contact where clay in excess is employed in one contact, no improvement results, while significant reduction of the corrosion characteristics was obtained by use of dual contact according to the present invention.

EXAMPLE III

In another experiment, lubricating oil compositions were produced by identical procedures except that in one run the components were dual treated and then blended while in a second run, the components were first blended and then subjected to the clay treatment. Data obtained are:

Table III

| | Contacted individually, then blended | Blended, then contacted |
|---|---|---|
| Filtrol dosage, lbs./bbl.: | | |
|   Neutral oil | 3 | 3 |
|   Bright stock | 6 | 6 |
| Attapulgus dosage, lbs./bbl. | 3 | 3 |
| MacCoull-Ryder test: | | |
|   Lead bearing loss, mgs. | 11.2 | 12.7 |
|   Viscosity increase (SUS/210° F) | 10.0 | 8.7 |
|   Acid number | 1.67 | 1.85 |

From these data it is apparent that improved lubricating oil compositions are produced by application of my dual contact method to the components individually or to a blend of the components.

I claim:

1. The method of producing non-additive aircraft engine lubricating oil compositions consisting essentially of about 5 to 50 volume percent of a refined neutral oil of a viscosity of about 300 to 600 SUS at 100° F. and 50 to 95 volume percent of a refined heavy mineral lubricating oil fraction of a viscosity of about 80 to 200 SUS at 210° F. which comprises contacting the refined neutral oil fraction with about 1 to 5 pounds of acid activated clay per barrel at a temperature of about 325 to 450° F., stripping said contacted neutral oil of components boiling at temperatures up to about 700° F., separating the neutral oil from the clay, contacting the refined heavy lubricating oil with about 4 to 8 pounds of acid activated clay per barrel at a temperature of about 500 to 600° F., stripping said contacted heavy lubricating oil of components boiling at temperatures up to about 700° F., separating the heavy lubricating oil from the clay, contacting each of the acid clay-treated neutral oil and heavy lubricating oil components with about 2 to 15 pounds of a neutral clay per barrel at a temperature of 275 to 350° F., separating the oil components from the neutral clay and blending the recovered oil components to obtain a lubricating oil composition.

2. The method of claim 1 wherein said neutral-clay treated components are also stripped of components boiling at temperatures up to about 700° F.

3. The method of producing non-additive aircraft engine lubricating oil compositions consisting essentially of about 5 to 50 volume percent of a refined neutral oil of about 300 to 600 SUS at 100° F. and 50 to 95 volume percent of a refined heavy mineral lubricating oil fraction of about 80 to 200 SUS at 210° F. which comprises contacting the refined neutral oil fraction with about 1 to 5 pounds of acid activated clay per barrel at a temperature of about 325 to 450° F., stripping said contacted neutral oil of components boiling at temperatures up to about 700° F., separating the neutral oil from the clay, contacting the refined heavy lubricating oil with about 4 to 8 pounds of acid activated clay per barrel at a temperature of about 500 to 600° F., stripping said contacted heavy lubricating oil of components boiling at temperatures up to about 700° F., separating the heavy lubricating oil from the clay, blending the acid clay-treated neutral oil and heavy lubricating oil components, contacting the resulting blend with about 2 to 15 pounds of a neutral clay per barrel at a temperature of 275 to 350° F., separating the blend of oil components from the neutral clay to obtain the lubricating oil composition.

4. The method of claim 3 wherein the neutral clay-treated blend of neutral oil and heavy lubricating oil also is stripped of components boiling at temperatures up to about 700° F.

References Cited in the file of this patent

UNITED STATES PATENTS

| | | |
|---|---|---|
| 2,067,334 | Osterstrom | Jan. 12, 1937 |
| 2,293,591 | Chenault | Aug. 18, 1942 |
| 2,461,454 | Toettcher | Feb. 8, 1949 |
| 2,594,880 | Davis | Apr. 29, 1952 |
| 2,695,865 | Mills | Nov. 30, 1954 |
| 2,726,997 | Dudley et al. | Dec. 13, 1955 |